(12) United States Patent
Okada (10) Patent No.: US 7,695,431 B2
(45) Date of Patent: Apr. 13, 2010

(54) OBJECTIVE LENS UNIT FOR ENDOSCOPE

(75) Inventor: Shinsuke Okada, Saitama-ken (JP)

(73) Assignees: HOYA Corporation, Tokyo (JP);
Optiscan Pty Ltd., Victoria (AU)

( * ) Notice: Subject to any disclaimer, the term of this patent is extended or adjusted under 35 U.S.C. 154(b) by 421 days.

(21) Appl. No.: 10/771,403

(22) Filed: Feb. 5, 2004

(65) Prior Publication Data

US 2004/0156124 A1  Aug. 12, 2004

(30) Foreign Application Priority Data

Feb. 10, 2003 (JP) ............... 2003-031818

(51) Int. Cl.
*A61B 1/06* (2006.01)
(52) U.S. Cl. ............ 600/176; 600/160; 600/168; 600/172; 600/175; 359/700; 359/701; 359/822; 359/826; 359/829
(58) Field of Classification Search .......... 600/111, 600/176; 359/811, 821, 822–827, 656–661, 359/694–701, 702, 704, 719, 829
See application file for complete search history.

(56) References Cited

U.S. PATENT DOCUMENTS

| | | | | |
|---|---|---|---|---|
| 3,560,080 | A | * | 2/1971 | Wilczynski ............ 359/813 |
| 3,889,662 | A | * | 6/1975 | Mitsui ................ 600/139 |
| 3,910,686 | A | * | 10/1975 | Nitami et al. ............ 359/822 |
| 3,989,358 | A | * | 11/1976 | Melmoth ................ 359/813 |
| 4,281,916 | A | * | 8/1981 | Aoyagi ................ 396/298 |
| 4,588,294 | A | * | 5/1986 | Siegmund ............ 600/117 |
| 4,706,653 | A | * | 11/1987 | Yamamoto ............ 600/175 |
| 4,856,495 | A | * | 8/1989 | Tohjoh et al. .......... 600/175 |
| 5,120,953 | A | | 6/1992 | Harris |
| 5,128,808 | A | * | 7/1992 | Dosaka ................ 359/821 |
| 5,272,567 | A | * | 12/1993 | Inoue ................ 359/696 |
| 5,323,009 | A | | 6/1994 | Harris |
| 5,411,020 | A | * | 5/1995 | Ito .................. 600/146 |
| 5,547,457 | A | * | 8/1996 | Tsuyuki et al. ......... 600/175 |

(Continued)

FOREIGN PATENT DOCUMENTS

JP          6-160684 A      6/1994

(Continued)

OTHER PUBLICATIONS

English language Abstract of JP 9-222568 A, Aug. 26, 1997.

(Continued)

*Primary Examiner*—Matthew J Kasztejna
(74) *Attorney, Agent, or Firm*—Greenblum & Bernstein PLC (57) ABSTRACT

An objective optical system is configured to be suitable to be implemented at a tip of an endoscope. The objective optical system is provided with a first lens unit having a first lens barrel and a first optical system including plurality of lens elements assembled in the first lens barrel, and a second lens unit having a second lens barrel and a second optical system including a plurality of lens elements. The first lens unit or the second lens unit includes an alignment lens which is movable in a direction perpendicular to the optical axis thereof. The alignment lens is a lens most sensitive with respect to an alignment error among the plurality of lenses included in the first optical system.

19 Claims, 8 Drawing Sheets

U.S. PATENT DOCUMENTS

| | | | | |
|---|---|---|---|---|
| 5,570,237 | A | * | 10/1996 | Sato ............................ 359/797 |
| 5,852,518 | A | * | 12/1998 | Hatasawa et al. ............ 359/822 |
| 5,989,185 | A | * | 11/1999 | Miyazaki ..................... 600/175 |
| 6,066,090 | A | * | 5/2000 | Yoon ............................ 600/113 |
| 6,095,970 | A | | 8/2000 | Hidaka et al. |
| 6,122,115 | A | * | 9/2000 | Plummer et al. ............. 359/822 |
| 6,134,056 | A | * | 10/2000 | Nakamuka ................... 359/784 |
| 6,590,721 | B2 | * | 7/2003 | Onda ........................... 359/819 |
| 6,695,775 | B2 | * | 2/2004 | Watanabe et al. ............ 600/176 |
| 6,773,392 | B2 | * | 8/2004 | Kikuchi et al. .............. 600/109 |
| 2002/0128535 | A1 | * | 9/2002 | Kikuchi et al. .............. 600/101 |
| 2002/0191910 | A1 | * | 12/2002 | Gallup et al. ................. 385/33 |

FOREIGN PATENT DOCUMENTS

| | | |
|---|---|---|
| JP | 9-222568 A | 8/1997 |
| JP | 2000-75218 | 3/2000 |
| JP | 2000-121961 | 4/2000 |
| JP | 2002-267915 A | 9/2002 |

OTHER PUBLICATIONS

English language Abstract of JP 6-160684 A, Jun. 7, 1994.
English language Abstract of JP 2002-267915 A, Sep. 18, 2002.

* cited by examiner

OBJECTIVE LENS UNIT FOR ENDOSCOPE

BACKGROUND OF THE INVENTION

The present invention relates to an objective lens unit for an endoscope, and a method of assembling the objective lens unit.

Conventionally, a confocal probe, which employs principle of confocal micrography, has become widely known. The confocal probe is configured to illuminate in vivo tissues inside human cavity, and selectively receive light reflected by the tissues on an object side focal plane. The confocal probe is provided with a-specific optical system (i.e., a confocal optical system) which has a relatively high magnification. Recently, a confocal endoscope system which is a combination of the confocal probe and an endoscope has been suggested. An example of such a confocal probe system is disclosed in Japanese Patent Provisional Publication P2000-1121961A.

Generally, an objective lens unit provided at the tip portion of the confocal probe or the endoscope is configured to have a plurality of lenses constituting an objective optical system and a lens barrel holding the plurality of lenses. An exemplary structure of such an objective lens unit is disclosed in Japanese Patent Provisional Publication P2000-75218A.

When such a small objective lens unit for precision instruments such as the confocal probe and the endoscope is assembled, a worker pinches lenses one by one using tweezers in accordance with a procedure, and drops the lens elements one by one in the lens barrel and locate them in predetermined positions of the lens barrel. Then, the worker places holding rings to fix the lenses inside the lens barrel.

The confocal probe is provided with an optical system similar to that of the confocal microscope, which is configured to observe an object at high magnification with high resolution. For this characteristic, the objective lens unit of the confocal probe is provided with a plurality of lenses, and possible aberrations are minimized.

The confocal probe has a small outer diameter, and many lenses which also have small diameters. Therefore, the lens barrel for the optical system of the confocal probe has a thin and elongated cylindrical shape. When the objective lens unit such as one for the confocal probe accommodating many lenses, as the worker inlets the lenses one by one, the lenses which are fitted in the lens barrel at an early stage of the assembling operation (i.e., the lenses located at a bottom side of the lens barrel) are located below the lenses assembled in later stage. Accordingly, between the lenses at the bottom side of the lens barrel and the worker, there area a plurality of lenses. Thus, the amount of light incident from the upper part of the lens barrel is lowered at the bottom side of the lens barrel by the plurality of lenses. Further, the lens barrel to which the lenses are fitted is formed to have an elongated shape. Therefore, light of the microscope entering from the above hardly reaches the bottom side of the lens barrel. Thus, during the assembling process, it is difficult for the worker to check the status of the lenses at the bottom side of the lens barrel. As a result, even if the lenses at the bottom side are misaligned, the worker may not recognize the misalignment. Such an assembling error sometimes causes deterioration of optical performances of the optical system.

SUMMARY OF THE INVENTION

The present invention is advantageous in that an improved objective lens unit is provided, which lens unit has an elongated cylindrical lens barrel accommodating a plurality of lenses, and is not be deteriorated due to the above-described assembling error is provided. The present invention is also advantageous in that a method of assembling such a lens unit.

According to an aspect of the invention, there is provided an objective optical system, which is configured to be suitable to be implemented at a tip of an endoscope. The objective optical system is provided with a first lens unit having a first lens barrel and a first optical system including plurality of lens elements assembled in the first lens barrel, and a second lens unit having a second lens barrel and a second optical system including a plurality of lens elements.

Optionally, the first lens unit may be provided with a fixing unit that fixes the first optical system to the first lens barrel. The second lens barrel may be assembled to the first lens barrel. In this case, the fixing unit is interposed between the first lens barrel and the second lens barrel to define a clearance therebetween.

Further optionally, at least one of the first lens unit and second lens unit may include an alignment lens which is movable in a direction perpendicular to the optical axis thereof.

The alignment lens may be included in the first optical system. In such a case, the first lens barrel may be formed with a plurality of holes through which parts of a circumferential surface of the alignment lens is seen.

Optionally, the alignment lens is movably accommodated in the first lens barrel, and the alignment lens may be moved by pins which are inserted through the plurality of holes, respectively.

Further optionally, the alignment lens may be a lens which is most sensitive with respect to the alignment error among the plurality of lenses included in the first optical system. In a particular case, the alignment lens may be most sensitive with respect to the alignment error among all the lenses included in the objective optical system.

Optionally, the alignment lens is a cemented lens.

Still optionally, the first lens barrel may be attached to the second lens barrel by a screw connection.

According to another aspect of the invention, there is provided a method of assembling an objective optical system that is suitable to be implemented at a tip of an endoscope. The method may include forming a first optical system by assembling a plurality of lenses in a first lens barrel, the first lens barrel being formed with a plurality of holes on a circumferential surface thereof, the plurality of holes allowing access to a predetermined one of the plurality of lenses in the first lens barrel, forming a second optical system by assembling a plurality of lenses in a second lens barrel which is to be coupled to the first lens barrel, inserting rods through the plurality of holes to move the predetermined one of the plurality of lenses in the first lens barrel to adjust an alignment thereof, fixing the predetermined one of the plurality of lenses to the first lens barrel, and coupling the first lens barrel and the second lens barrel with maintaining a coaxial state of an optical axis of the first optical system and an optical axis of the second optical system.

DETAILED DESCRIPTION OF THE EMBODIMENTS

Hereinafter, an electronic endoscope system according to an embodiment of the present invention will be described with reference to the accompanying drawings.

Figure 1:
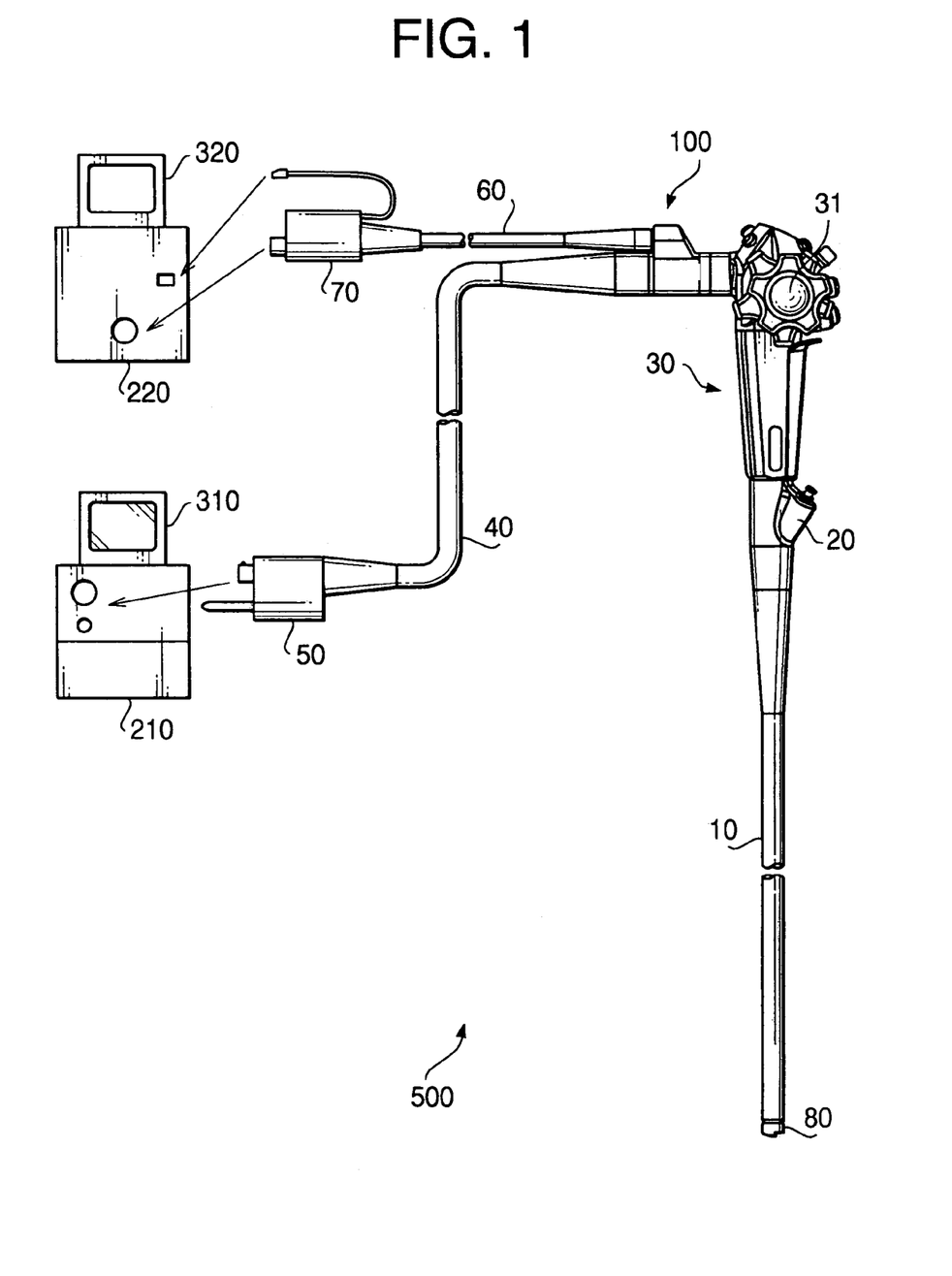
FIG. 1 schematically shows an electronic endoscope system according to an embodiment of the invention.

FIG. 1 schematically shows an electronic endoscope system 500 according to the embodiment of the invention. The electronic endoscope system 500 includes an electronic endoscope 100, a first processor 210, a second processor 220, a first monitor 310 and a second monitor 320.

The electronic endoscope 100 includes a first optical system for observing in vivo tissues inside the human cavity at a low magnification and a second optical system for observing the in vivo tissues at a high magnification. The first processor 210 processes the low magnification image and displays the processed image on the first monitor 310. The second processor 220 processes the high magnification image and displays the processed image on the second monitor 320.

The electronic endoscope 100 includes a flexible inserting tube 10, which is to be inserted into a human body, and an operation portion 30 fixed on a proximal end of the flexible inserting tube 10.

The electronic endoscope 100 further includes a universal cord 40 and a confocal system cord 60, both extending from the operating portion 30. The universal cord 40 is connected with the first processor 210 through an endoscope connector 50 provided on the end of the universal cord 40. The confocal system cord 60 is connected with the second processor 220 through a confocal system connector 70 provided on the end of the confocal system cord 60.

A forceps inserting opening 20 is formed on the operation portion 30 near the distal end thereof. The forceps inserting opening 20 is for inserting a forceps into the flexible inserting tube 10. Various kinds of forceps for stopping bleeding, picking up in vivo tissues, or the like are selected in accordance with the type of operation to be performed. The forceps is advanced along a forceps channel (not shown) formed through the flexible inserting tube 10 and protrudes from the tip end 80 of the flexible inserting tube 10.

The operating portion 30 is provided with multiple knobs 31, which are manipulated by an operator for controlling bending direction and bending angle of the flexible inserting tube 10 to observe a desired portion inside the human body with the electronic endoscope 100 or to treat them with the forceps protruded from the tip end 80.

Figure 2:
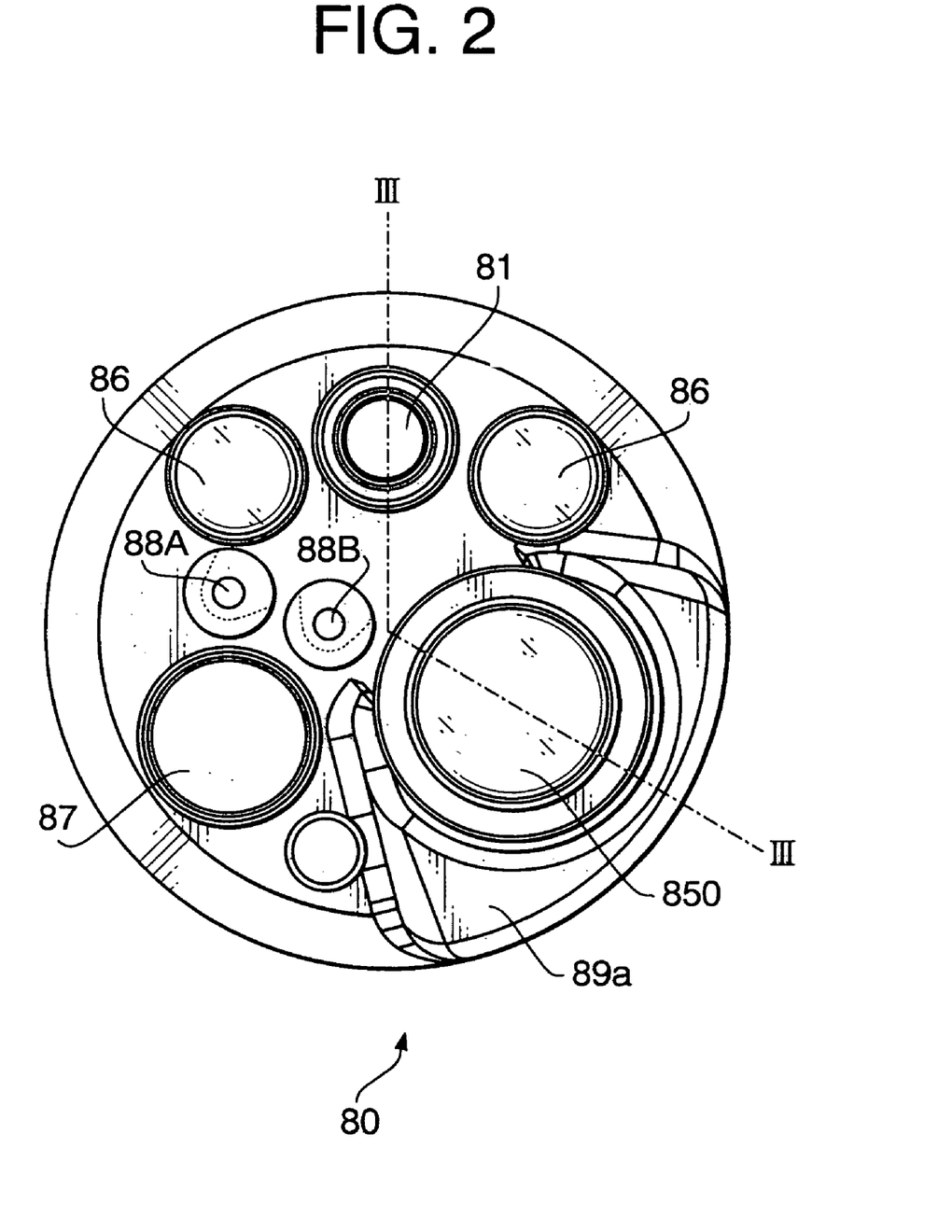
FIG. 2 is a front view of a tip end of a flexible inserting tube of an electronic endoscope shown in FIG. 1.
Figure 3:
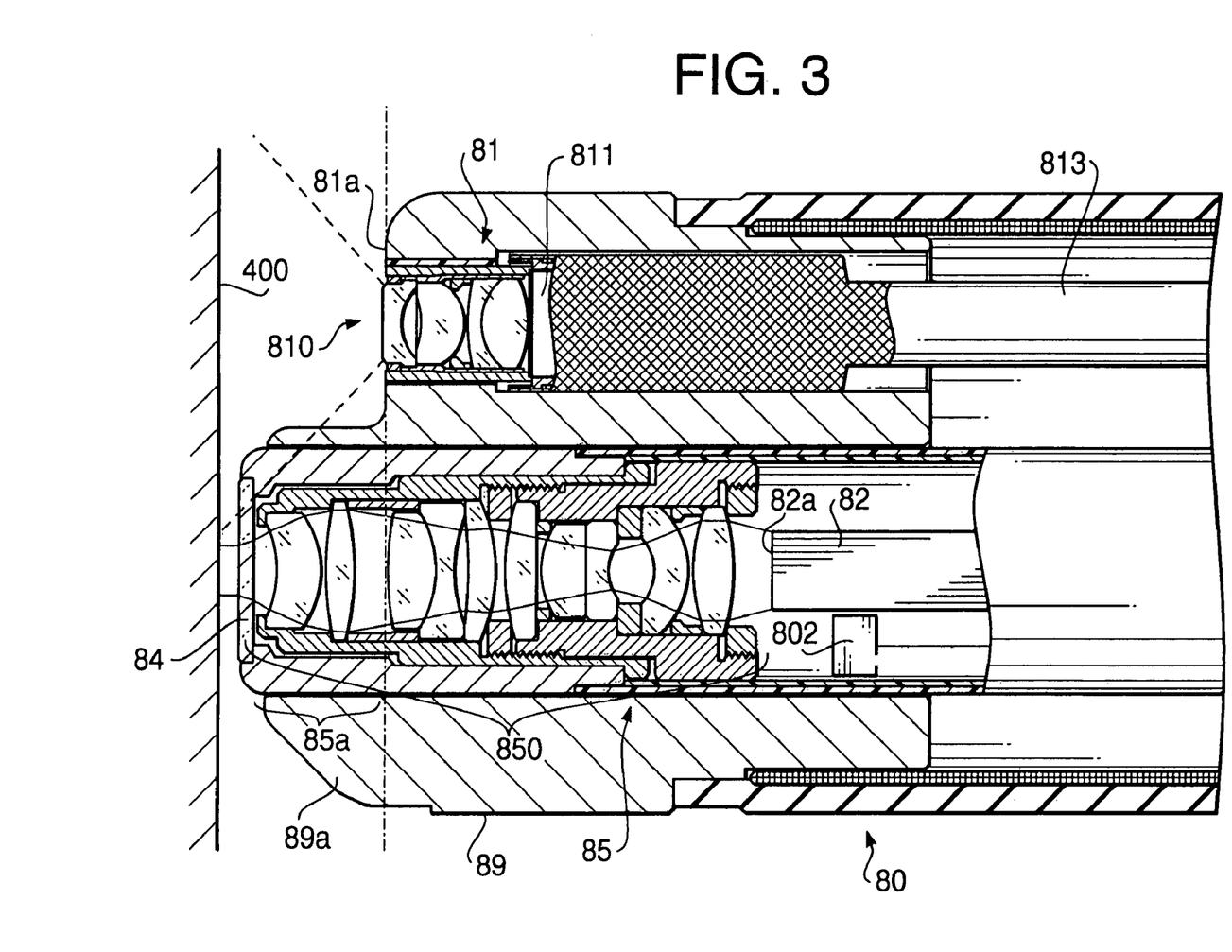
FIG. 3 is a sectional view of the tip end of the flexible inserting tube shown in FIG. 1 taken along line III-III.

FIG. 2 is a front view of the tip end 80 of the flexible inserting tube 10, and FIG. 3 is a sectional view of the tip end 80 taken along a line III-III in FIG. 2.

A tip body 89, made of hard resin, for example, is fixed on the tip end 80 of the flexible inserting tube 10(see FIG. 1). A front face 81a of the tip body 89 is provided with two illumination windows 86 (see FIG. 3) through which light is emitted onto a target 400, a forceps channel opening 87 through which the forceps is protruded, and an air feeding opening 88A and a water feeding opening 88B for feeding air and water to the target 400, respectively.

As shown in FIG. 3, the tip body 89 holds an endoscope unit 81 and a confocal unit 85. The endoscope unit 81 includes an objective lens system (the first objective lens system) 810 for observing the target 400 in the human body at a low magnification and a solid-state imaging device 811. The solid-state imaging device 811 is disposed on a rear focal plane of the objective lens system 810. The objective optical system 810 forms an image of the target 400 on the solid-state imaging device 811.

The confocal unit 85 includes an optical fiber 82 and an objective lens system (the second objective optical system) 850 for observing the target 400 at a high magnification. The second objective optical system 850 has a glass cover 84 at the front end thereof for protecting other optical elements of the second objective optical system 850. The optical fiber 82 is a single mode optical fiber connected to the confocal system cord 60 that is connected to the second processor 220 with the confocal system connector 70. The optical fiber 82 extends from the tip end 80, through the flexible inserting tube 10, to the operation portion 30. The confocal unit 85 holds the optical fiber 82 such that a distal end face 82a thereof is on a rear focal plane of the second objective optical system 850.

The confocal unit 85 further includes an actuator 802, such as a piezoelectric actuator, for moving the distal end face 82a of the optical fiber 82. A laser beam is emitted from the distal end face 82a of the optical fiber 82 and is irradiated on the target 400 through the second objective optical system 850. The actuator 802 swings the distal end face 82a of the optical fiber 82 so that the laser beam emerging therefrom scans on the target 400.

Referring back to FIG. 1, the first processor 210 is provided with a not shown light source. The light emitted from the light source is transmitted through two light guides (not shown) extending through the electronic endoscope 100 (i.e., the universal cord 40, the operation portion 30, and the flexible inserting tube 10) and emitted from the illumination windows 86 to illuminate the target 400.

The first objective optical system 810 forms an image of the illuminated target 400 on the solid-state imaging device 811. The solid-state imaging device 811 converts the optical image into an image signal and sends it to the first processor 210 through a signal line 813 (see FIG. 3) extending through the electronic endoscope 100 (i.e., the flexible inserting tube 10, the operation portion 30, and the universal cord 40). The first processor 210 receives the image signal and generates a video signal, which is sent to the first monitor 310 to display the low magnification image captured by the solid-state imaging device 811.

The second processor 220 is provided with a not shown laser source. The laser beam emitted from the laser source is introduced into the optical fiber 82 of the electronic endoscope 100 through the confocal system connector 70. The laser beam transmits through the optical fiber 82 and emerges from the distal end face 82a thereof proceeds toward the second objective optical system 850.

The second objective optical system 850 focuses the light to a small spot on the target 400, which is located on the front focal plane of the second objective optical system 850. Light reflected back from the illuminated spot on the target 400 is collected by the second objective optical system 850 and converged onto the distal end face 82a of the optical fiber 82.

As previously described, the distal end face 82a of the optical fiber 82 is located on the rear focal plane of the second objective optical system 850. Thus, the distal end face 82a and the illuminated spot on the target 400 have a conjugate relationship with respect to the second objective optical system 850. Since the core of the optical fiber 82 is quite small, the core serves as a confocal pinhole, which allows only the light returned from the spot on the target 400 to enter the optical fiber 82 and to block light that did not originate from the spot.

The returned light introduced into the optical fiber 82 transmits therethrough and is directed to the second processor 220. The second processor 220 includes a not shown photosensor, which detects the intensity of the light transmitted through the optical fiber 82.

As previously described, the distal end of the optical fiber 82 is moved by the actuator 802 so that the laser beam scans the target 400. Since the optical characteristic of the target 400, which are in vivo tissues in the present embodiment, varies with the location thereon, the intensity of the light returned from the target 400 varies as the laser beam scans. Thus, the second processor 220 can generate an optical tomography of the target 400 based on the intensity of the light received through the optical fiber 82. The optical tomography is then displayed on the second monitor 320.

Next, a positional relationship between the endoscope unit 81 and the confocal unit 85 will be described with reference to FIGS. 2 and 3. As previously described, the tip body 89 is mounted on the tip end 80 of the flexible inserting tube 10. The endoscope unit 81 is held by the tip body 89 such that the front face of the first objective optical system 810 is substantially flush with the front face 81a of the tip body 89. The confocal unit 85 is disposed such that a front end portion 85a thereof protrudes from the front face 81a of the tip body 89. In other words, the confocal unit 85 is disposed such that the second objective optical system 850 is slightly protruded forward with respect to the first optical system 810.

The front face 81a of the tip body 89 is partially protruded to form a cover portion 89a that surrounds the circumferential surface of the front end portion 85a of the confocal unit 85. The cover portion 89a protects the front end portion. 85a of the confocal unit 85, which is thin and weak, so that a large force will not be applied thereto directly.

The cover portion 89a is tapered toward the front end thereof. Thus, the cover portion 89a, which protrudes from the front face 81a of the tip body 80, does not cause damage to a body even when the flexible inserting tube 10 is inserted into a narrow space of the body.

Figure 4:
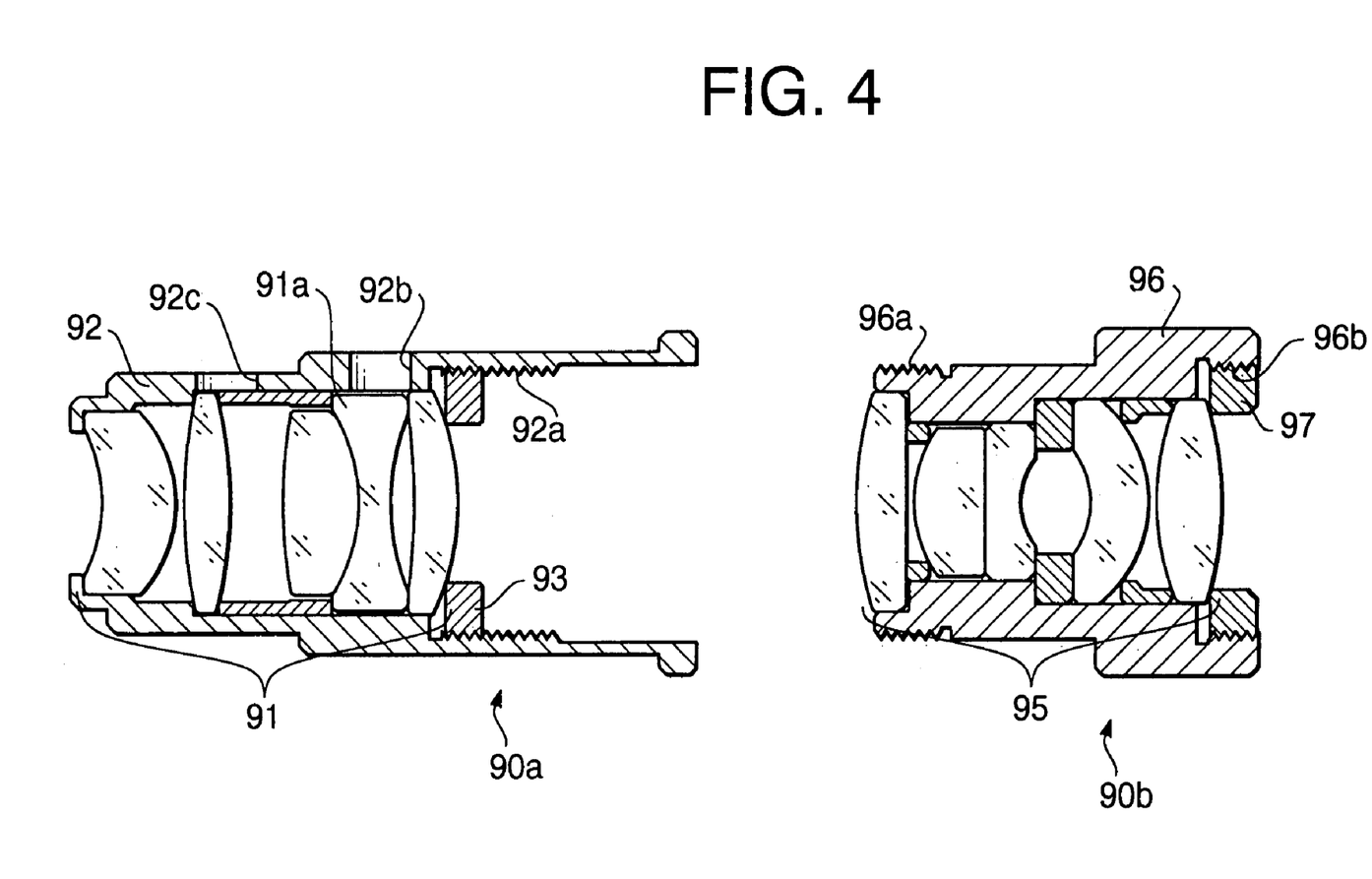
FIG. 4 shows a cross sectional side view of the objective lens unit divided into two units.

FIG. 4 is a cross sectional view showing the confocal objective lens unit 90 divided into two units: an alignment lens unit 90a and a lens unit 90b. In the example shown in FIG. 4, the lens unit 90a and the lens unit 90b has the same number of lenses.

The alignment lens unit 90a includes an objective optical system 91, a lens barrel 92 in which the objective optical system 91 is assembled, and a lens holding ring 93 for press fixing the objective optical system 91 inside the lens barrel 92. The lens barrel 92 is formed with a screw-threaded portion 92a on the inner surface thereof to be engaged with a screw portion formed on an outer circumferential surface of the lens holding ring 93. A plurality of alignment holes 92b and adhering holes 92c are formed on the circumferential surface of the lens barrel 92. The objective optical system 91 includes five lens elements in this embodiment, which include an alignment lens 91a that is to be aligned using the aligning jig. In the embodiment, the alignment lens 91a is a cemented lens, which is configured such that a positive lens and a negative lens are cemented. When the alignment lens unit 90a is assembled, a plurality of lenses (and a spacer, if necessary) are dropped in the lens barrel 92 and fixed therein. The objective optical system 91 is fixed inside the lens barrel 92 by a pressing force of the lens holding ring 93 which is engaged with the threaded portion 92a. Further, adhesive agent is injected through the adhering holes 92c, and thus the objective optical system 91 is fixedly secured on the inner surface of the lens barrel 92.

The lens unit 90b includes an objective optical system 95 which is a part of the objective optical system of the confocal optical system, a lens barrel 96 accommodating the objective optical system 95, and a lens holding ring 97 that press-fix the objective optical system 95 inside the lens barrel 96. The lens barrel 96 has a threaded portion 96b on the inner surface of the lens barrel 96 to engage with the screw threaded on the outer circumferential of the lens holding ring 97. Further, an outer screw 96a is formed on the outer circumference of the lens barrel 96 to engage with the threaded portion 92a of the lens barrel 92.

The objective optical system 95 is provided with five lens elements, which are dropped one by one in the lens barrel 96 when assembled (spacers are also dropped if necessary). Further, objective optical system 95 is press-fixed in the lens barrel 96 by the pressing force of the lens holding ring 97 which is engaged with the threaded portion 96b of the lens barrel 96.

By engaging the outer screw 96a of the lens barrel 96 with the threaded portion 92a of the lens barrel 92, and fastening the same until the alignment lens unit 90a side lens (i.e., the left hand side lens in FIG. 4) of the objective optical system 95 abuts the holding ring 93, the alignment lens unit 90a and the lens unit 90b are fixed with a predetermined clearance therebetween, and thus the confocal objective lens unit 90 has been assembled.

It should be noted that, at this stage, the optical axis of the objective optical system 91 and the optical axis of the objective optical system 95 coincide with each other.

The object image formed by the objective lens system 810 is captured by the solid state imaging element 811, which outputs an image signal corresponding to the captured image to the first processor 210. The first processor 210 processes the received image signal to generate a video signal, which is then displayed on the monitor 310 as the observing image using the endoscopic objective lens system 810.

The object image obtained through the confocal objective optical system 850 is directed to the second processor 220 through the single mode optical fiber 82. The object image introduced into the second processor 220 is processed and converted into the video signal, which is output to the second monitor 320 and is displayed as the observing image through the confocal objective optical system.

Figure 5:
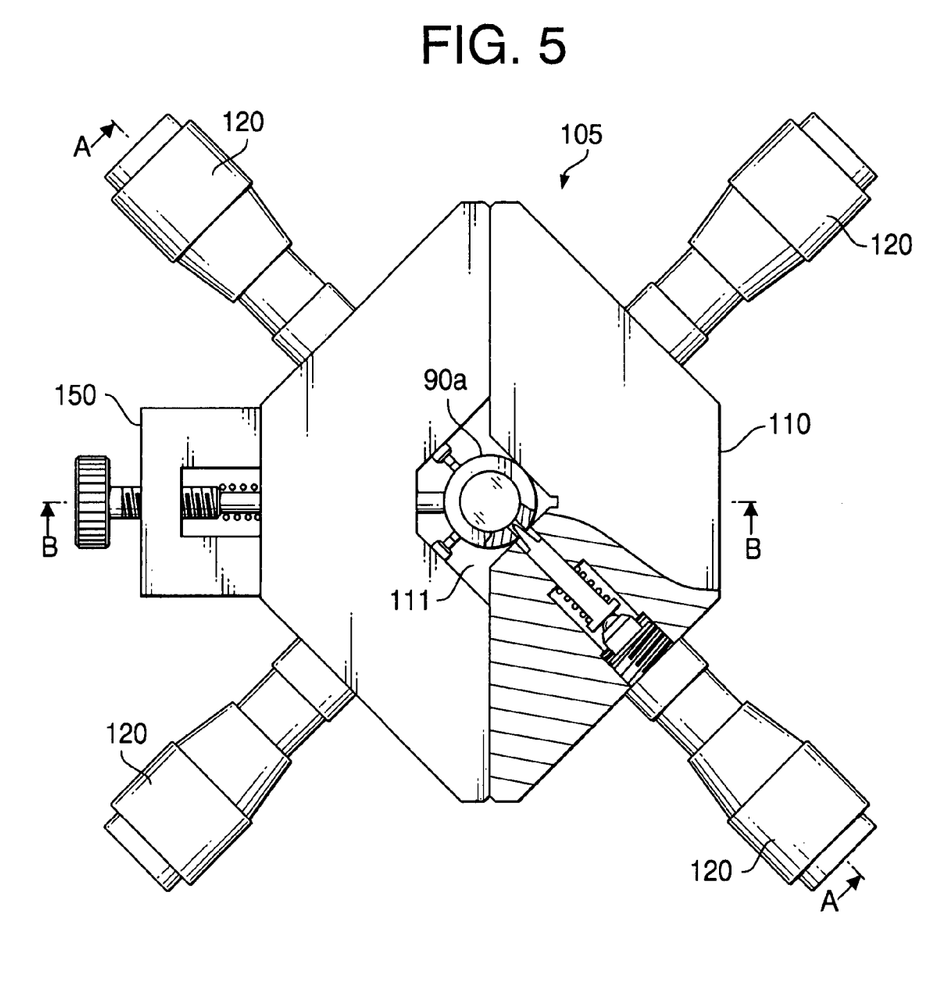
FIG. 5 is a plan view of an aligning jig and the lens unit set to the aligning jig.
Figure 6:
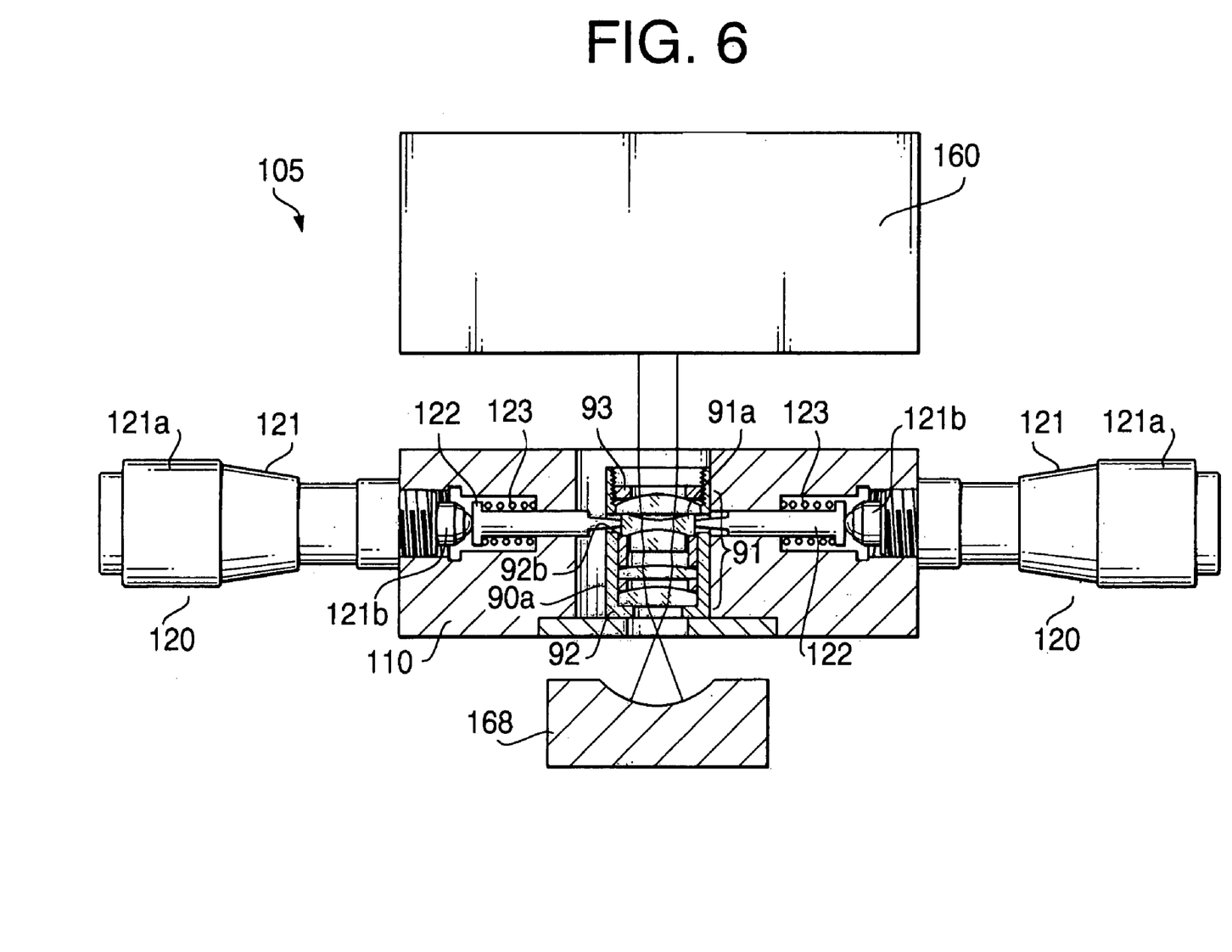
FIG. 6 is a cross sectional view of the aligning jig taken along line A-A in FIG. 5.
Figure 7:
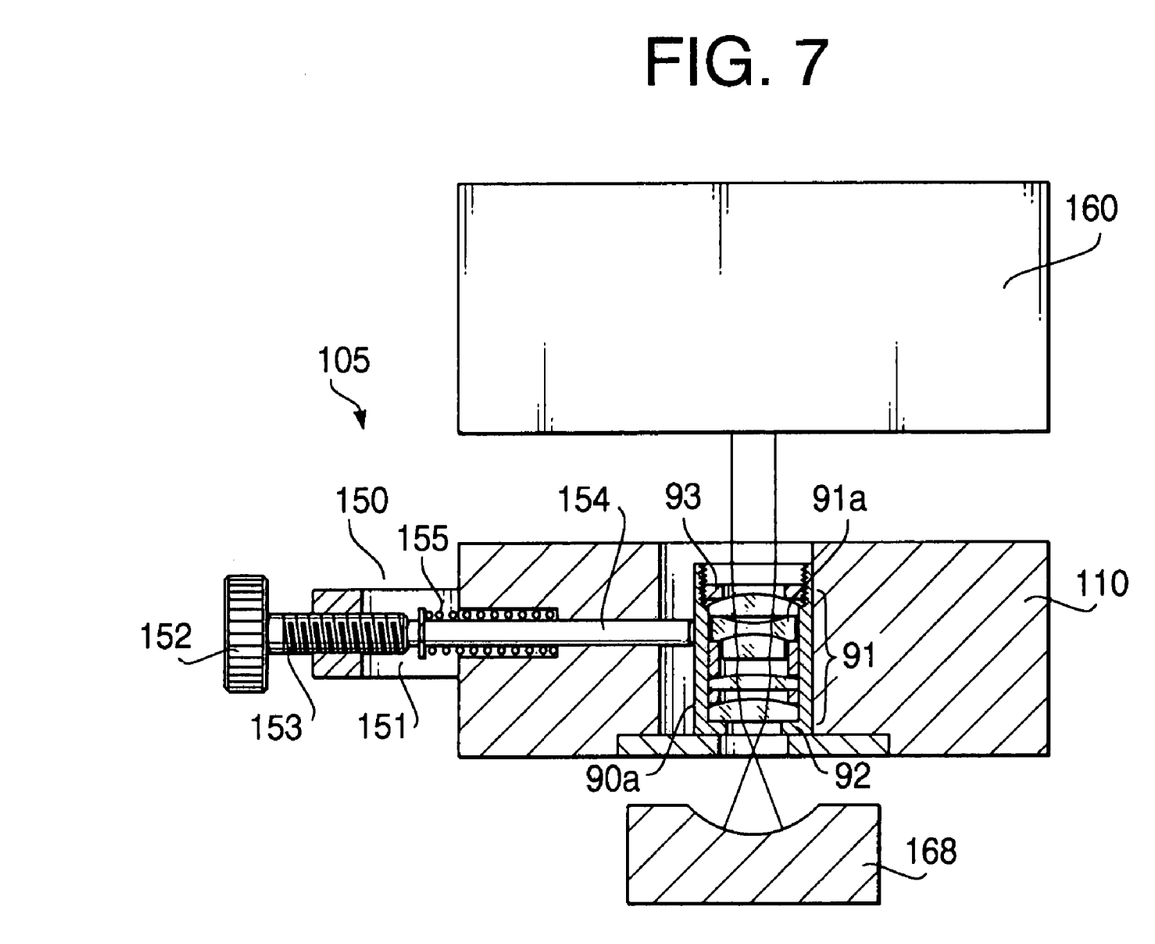
FIG. 7 is a cross sectional side view of the aligning jig taken along line B-B in FIG. 5.

FIG. 5 is a plan view of an alignment jig 105, which is for aligning the alignment lens unit 90a set to the alignment jig 105, according to the embodiment of the invention. FIGS. 6 and 7 are cross sectional views of the alignment jig 105 and the alignment lens unit 90a taken along line A-A and line B-B of FIG. 5, respectively.

The lens barrel 92 has, as described above, a plurality of alignment holes 92b on its circumferential surface. In the alignment holes 92b, alignment pins, which will be described later, are inserted. The alignment holes 92b are provided such that the circumferential surface of the alignment lens 91a arranged in the lens barrel 92 can be seen through the alignment holes 92b.

The diameters of the plurality of lenses of the objective optical system 91 are slightly smaller than the inner diameter of the lens barrel 92 so as to allow the lenses to be smoothly fitted in the lens barrel 92. That is, there is clearance between each lens of the objective optical system 91 and the inner surface of the lens barrel 92. The alignment lens unit 90a is configured such that, by moving the alignment lens 91a relative to the other lenses of the objective optical system 91, deterioration of the optical performances due to the assembling error of the objective optical system 91 with respect to the lens barrel 92 is reduced. In this regard, the clearance between the lens barrel and the alignment lens 91a is greater than the clearance between the lens barrel 92 and the other lenses. The clearance allows the alignment lens 91a to be shifted to a position where the deterioration of the optical performance of the alignment lens unit 90a due to the assembling error is suppressed (i.e., the optical performance as desired can be achieved).

Incidentally, the assembling error occurs due to manufacturing errors of the clearance and sizes of the lens barrel 92 and each lens of the objective optical system 91 within the allowed tolerance. It should be noted that the confocal objective optical system is configured such that, among the lenses thereof, the alignment lens 91a is most sensitive to the alignment error.

Further, according to the embodiment, the lenses assembled in the lens barrel 96 are not so sensitive with respect to the alignment error. Therefore, only one lens unit (i.e., the alignment lens unit 90a) is provided with a lens to be moved (i.e., the alignment lens 91a), and the alignment error is eliminated before the two lens unit 90a and 90b are assembled. It is of course possible to provide the alignment lens to each lens unit, or to move the alignment lens 91a after the two lens units 90a and 90b are assembled.

The alignment jig 105 includes a main body 110, aligning units 120 for moving the alignment lens 91a, a fixing unit 150 that fixedly secures the alignment lens unit 90a to the main body 110 and an interferometer 160 used for checking whether the alignment of the objective optical system 91 is achieved.

The main body 110 serves as a base of the units of the alignment jig 105, and has four aligning units 120 and one fixing unit 150 on its side surface. Further, the main body 110 has an accommodating chamber 111, in which the alignment lens unit 90a is placed, at the central portion thereof.

There are four aligning units 120, which are apart by 90 degrees from each other. Each of the aligning units 120 includes a micrometer 121, an aligning pin 122 and aligning springs 123 wound around the aligning pin 122. The micrometer 121 is configured to be similar to a conventional micrometer. By rotating the rotational knob 121a, a protruded amount of the shaft 121b varies. Specifically, by rotating the rotational knob 121a clockwise, the tip of the shaft 121b moves toward the center of the main body 110, while by rotating the rotational knob 121a counterclockwise, the tip of the shaft 121b moves away from the center of the main body 110.

At the tip of each shaft 121b, the aligning pin 122 is provided. The tip of the aligning pin 122 extends to the accommodating chamber 111. On a circumferential surface of each aligning pin 122, the aligning spring 123 is wound. The aligning spring 123 is arranged such that the aligning pin 122 is biased toward the shaft 121b. That is, the shaft 121b and the aligning pin 122 are biased to normally contact each other.

With the above structure, when the rotational knob 121a is rotated clockwise to move the shaft 121b toward the center of the main body 110, the aligning pin 122 is press-contacted against the tip of the shaft 121b, and the aligning pin 122 moves toward the center of the main body 110 by the same amount as the shaft 121b moves. When the rotational knob 121a is rotated counterclockwise to move the shaft 121b away from the center of the main body 110, the aligning pin 122 also moves away from the center of the main body 110, due to the biasing force of the aligning spring 123, by the same amount as the shaft 121b moves.

The fixing unit 150 is arranged to penetrate through the main body 110, from a side surface thereof to the accommodating chamber 111. The fixing unit 150 is for fixing the alignment lens unit 90a inside the accommodating chamber 111, and is provided with a fixing frame 151, fixing knob 152, a screw portion 153, a fixing rod 154 and a spring 155. The fixing frame 151 has a threaded portion with which the screw portion 153 engages. The fixing knob 152, screw portion 153 and fixing rod 154 are formed integrally. Thus, by rotating the fixing knob 152 clockwise, due to the engagement of the threaded portion of the fixing frame 151 with the screw portion 153, the fixing rod 154 moves toward the center of the main body 110, while by rotating the fixing knob 152 counterclockwise, the fixing rod 154 moves away from the center of the main body 110.

The tip of the fixing rod 154 extends to the accommodating chamber 111. On the circumferential surface of the fixing rod 154, a spring 155 is wound so that the fixing rod 154 is biased to move away from the center of the main body 110. Thereby, backlash between the threaded portion of the fixing frame 151 and the screw portion 153 is removed.

Figure 8:
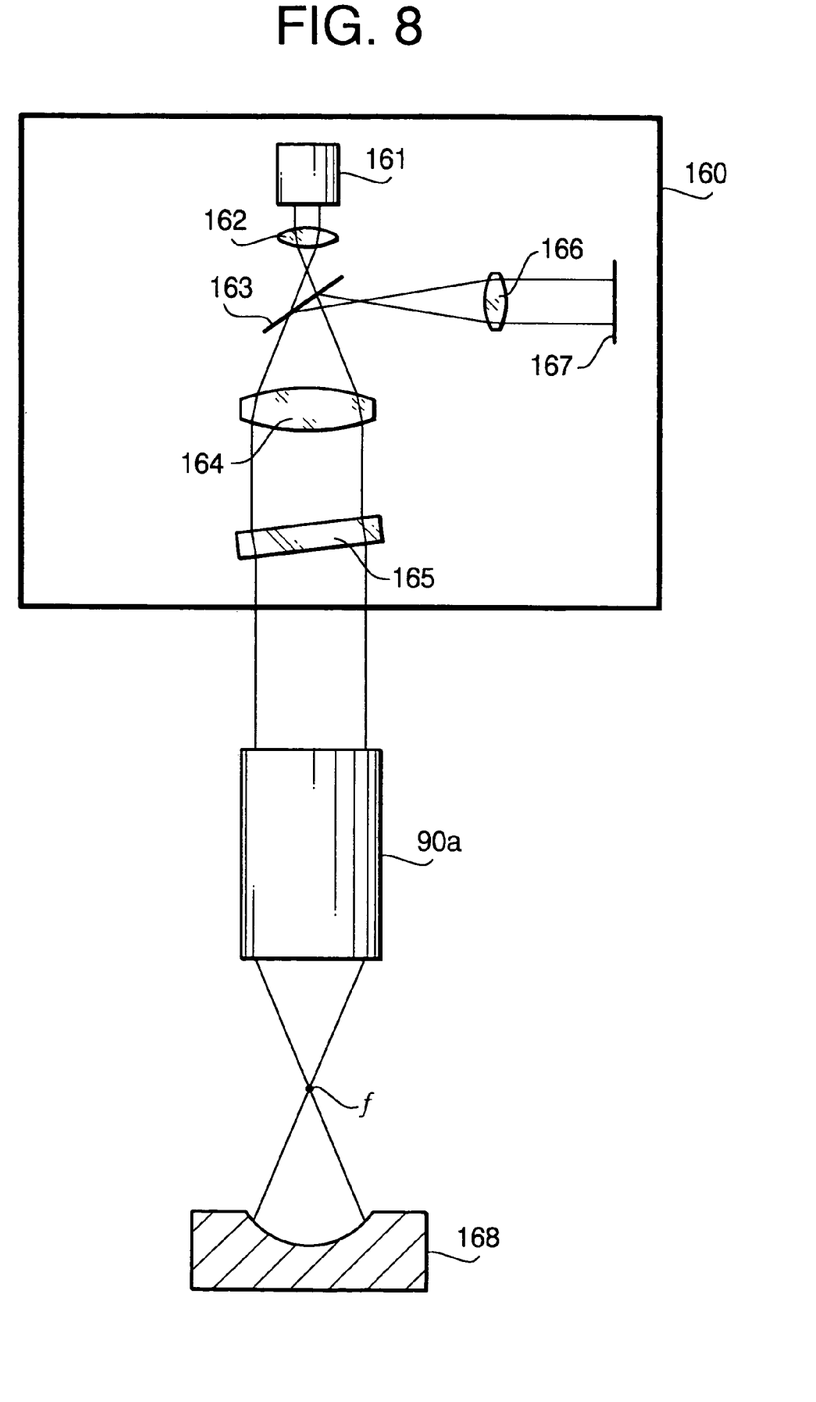
FIG. 8 is an interferometer used for adjusting an alignment of the alignment lens.

FIG. 8 schematically shows a configuration of the interferometer 160 for examining whether the alignment of the objective optical system 91 (i.e., alignment of the alignment lens 91a according to the embodiment) is done precisely by observing interference pattern generated by the interference of the rays passing through the objective optical system 91 with reference rays generated inside the interferometer 160.

The interferometer 160 includes a laser source 161, a lens 162, a beam splitter 163, a collimating lens 164, a parallel plate 165, an imaging optical system 166, a screen 167 and a concave mirror 168.

The laser source 161 emits a He—Ne laser beam having a wavelength of 632 nm. The laser beam emitted by the laser source 161 and passed through the lens 162 once converges and then diverges and enter the beam splitter 163. The beam passed through the beam splitter 163 is incident on the collimating lens 164, and enters the parallel plate 165 as a collimated beam having a diameter greater than that of the beam emitted by the laser source 161.

The parallel plate 165 is arranged such that a normal to a light incident surface thereof is slightly inclined with respect to the optical axis of the interferometer 160. Part of the light incident of the parallel plate 165 is reflected thereby, and the other part of the light incident of the parallel plate 165 passes therethrough. The light reflected by the parallel plate 165 is incident on the beam splitter 163 via the collimating lens 164, and reflected by the beam splitter 163, at right angle, and is directed toward an imaging optical system 166.

The light passed through the parallel plate 165 is incident on the alignment lens unit 90a which is the optical system to be examined. The collimated beam (i.e., parallel light) incident on the alignment lens unit 90a is converged on a point f, and incident on the concave mirror 168 as a diverging light. The concave mirror 168 has a spherical surface and is arranged such that the center of curvature of the spherical surface coincide with the point f. Therefore, the light diverging from the point f and is reflected by the concave mirror 168 is converged again at the point f. It should be noted that the position of the point f varies depending on the lens to be examined. Thus, according to the embodiment, the concave mirror 168 is configured to be movable in the direction of the optical axis of the interferometer 160. The concave mirror 168 is moved so that the center of the curvature of the mirror surface coincide with the focal point of the optical system to be examined.

The light reflected by the concave mirror 168 proceeds back to the beam splitter 163 via the alignment lens unit 90a, the parallel plate 165 and the collimating lens 164, and then reflected by the beam splitter 163, at a right angle, toward the imaging optical system 166.

As a result, the light reflected by the parallel plate 165 and the light passed through the alignment lens unit 90a, reflected by the concave mirror 168 and then reflected by the beam splitter 163 interfere, an image of which is projected on the screen 167 by the imaging optical system 166.

When the alignment of the objective optical system 91 has been done and the deterioration of the optical performance due to misalignment of each lens of the objective optical system 91 is well reduced, the light directed to the screen 167 through the alignment lens unit 90a is a plane wave. Since the light reflected by the parallel plate 165 and directed to the screen 167 is also a plane wave, the interfering pattern shows the interference between the plane waves caused by the slight inclination of the parallel wave is formed on the screen 167. That is, the interference pattern shows a pattern consisting of straight lines.

According to the embodiment, as described above, the confocal objective optical system is configured such that the alignment lens 91a is most sensitive to the alignment error. In other words, by adjusting the alignment of the alignment lens 91a, the optical performance of the objective optical system 91 can be improved. If the optical performance is deteriorated, the light directed to the screen 167 via the alignment lens unit 90a exhibits wavefront aberration. In this case, the interference pattern on the screen 167 is formed by the wave having the wavefront aberration and the plane wave caused by the slight inclination of the parallel plate. The interference pattern in this case is distorted.

Hereinafter, the method of adjusting the alignment of the objective optical system 91 using the alignment jig 105 according to the embodiment will be described.

Firstly, the worker places the lens barrel 92 in the alignment jig 105 such that the longitudinal direction of the lens barrel 92 is oriented in the vertical direction and the threaded portion 92a is on the upper side so that the inside the lens barrel 92 can be observed using the microscope from the above. Then, the worker drops the lenses of the objective optical system 91 one by one and in the lens barrel 92. During this procedure, the worker checks the positions of the lenses fitted in the lower portion of the lens barrel 92. If the lenses are fitted in wrong positions (i.e., positions different from the designed positions), the worker adjusts the positions of the lenses using the tweezers.

When all the lenses of the objective optical system 91 are fitted in the lens barrel 92, the lens holding ring 93 is preliminarily fastened. Then, the lens barrel 92 accommodating the objective optical system 91 (i.e., the alignment lens unit 90a) is set to the accommodating chamber 111 of the alignment jig 105. When the alignment lens unit 90a is accommodated in the accommodating chamber 111, the alignment holes 92b are faced to the aligning pins 122 so that the four aligning pins 122 can be inserted through alignment holes 11a, respectively. When the positional relationship is adjusted, the fixing unit 150 is operated to fix the alignment lens unit 90a by pressing the same with the fixing rod 154. It should be noted that the lens holding ring 93 has been preliminarily fastened to press the objective optical system 91 so that the alignment lens 91a can be moved with the pressing force of the aligning pints 122, and further the alignment lens 91a may not be moved in the direction of the optical axis thereof.

The alignment holes 92b are formed at positions facing the side surface of the alignment lens 91a. By operating the micrometer 121 to insert the aligning pins 122 through the four alignment holes 92b to press the alignment lens 91a, the alignment lens 91a can be moved relative to the objective optical system 91.

For example, when the rotational knob 121a of one aligning unit 120 is rotated clockwise to press the alignment lens 91a toward the center of the main body 110 with the shaft 121b, and at the same time, by rotating the rotational knob 121a located at the opposite position counterclockwise to move the shaft 121b away from the center of the main body 110, the alignment lens 91a moves by an amount same as the moving amount of the shaft 121a (i.e., 121b) relative to the other lenses of the objective optical system 91. The interference pattern obtained by the interferometer 160 described above is captured by a not-shown CCD (Charge Coupled Device) and is displayed on a monitor. Thus, the worker operates the aligning pins 122 with viewing the monitor displaying the interference pattern to move the alignment lens 91a, thereby alignment of the objective optical system 91 being performed.

When the alignment of the objective optical system 91 by adjusting the position of the alignment lens 91a is finished, the worker operates the fixing unit 150 to release the fixing rod 154, removes the aligning pins 122 from the alignment holes 90b, and picks up the alignment lens unit 90a from the accommodating chamber 111. After picking up the alignment lens unit 90a, the worker injects adhesive agent to each of the plurality of adhering holes 92c to fill the adhesive agent around the spacers which are fixed to the alignment lens 91a. When the injected adhesive agent is dried and hardened, the lens holding ring 93 is fully tightened, thereby press-fixing the objective optical system 91. With the alignment procedure above, the lens barrel 92 and the alignment lens 91a are aligned and fixed (i.e., the alignment of the objective optical system 91 is finished), using the alignment jig 105, and the assembling of the alignment lens unit 90a is finished.

Next, the worker assembles the lens unit 90b. The worker set the lens barrel 96 such that the longitudinal direction of the lens barrel 96 is oriented in the vertical direction and the outer screw 96a is on the upper side so that the inside the lens barrel 96 can be observed from the above using the microscope. Then, the worker picks the lenses of the objective optical system 95 one by one and drops the same in the lens barrel 96. During this procedure, the worker checks the positions of the lenses fitted in the lower portion of the lens barrel 96. If the lenses are fitted in wrong positions (i.e., positions different from the designed positions), the worker adjusts the positions of the lenses using the tweezers. When all the lenses of the objective optical system 95 are fitted in the lens barrel 96, the lens holding ring 93 is fully tightened to press-fix the objective optical system 95 inside the lens barrel 96, thereby the lens unit 90b is assembled.

The thus assembled alignment lens unit 90a and the lens unit 90b are connected by fastening the threaded portion 92a against the outer screw 96a. By fastening the lens unit 90b with respect to the alignment lens unit 90a till the lens unit 90a side lens of the objective optical system 95 contacts the lens holding ring 93. Thus, the confocal objective lens unit 90 has been assembled. It should be noted that, the confocal objective lens unit 90 having little deterioration of the optical performance due to the assembling error can be assembled, if the alignment lens unit 90a and the lens unit 90b having little assembling error are selected.

The present invention is described with reference to the exemplary embodiment. It should be note that the invention is not limited to the configuration described above, and can be modified in various ways without departing from the scope of the invention.

For example, in the above-described embodiment, the alignment lens unit 90a and the lens unit 90b are assembled separately after the alignment is completed, and then assembled together to form the confocal objective optical system. However, the invention need not be limited to this configuration. The alignment lens unit 90a and the lens unit 90b are assembled before the alignment, and then the aligning process may be done using the alignment jig 105 with respect to the assembled alignment lens unit 90a.

The present disclosure relates to the subject matter contained in Japanese Patent Application No. P2003-031818, filed on Feb. 10, 2003, which is expressly incorporated herein by reference in its entirety.

What is claimed is:

1. An objective optical system configured to be implemented in a tip of an endoscope, the system comprising:
   a first lens unit having a first lens barrel and a first optical system including a plurality of lens elements assembled in said first lens barrel and aligned in a direction of a first common optical axis; and
   a second lens unit having a second lens barrel, engageable with said first lens barrel, and a second optical system including a plurality of lens elements aligned in a direction of a second common optical axis,
   said first lens unit being provided with a fixing unit that fixes said first optical system to said first lens barrel said fixing unit having a threaded surface that is engaged with a threaded surface of said first lens barrel to fix said first optical system to said first lens barrel, said second lens barrel being assembled to said first lens barrel, said fixing unit being interposed between said first lens barrel and said second lens barrel to define a clearance therebetween;
   wherein, when the first lens barrel is engaged with the second lens barrel, the lens elements of the first and second lens barrels are aligned along a common axis, the first common axis and the second common axis comprising the common axis; and
   wherein said first lens unit includes an alignment lens movable in a direction perpendicular to an optical axis thereof, movement of the alignment lens in the direction perpendicular to the optical axis alone adjusting an alignment of the entire plurality of lens elements assembled in the first lens unit, said first lens barrel being formed with a plurality of unthreaded holes through which parts of a circumferential surface of said alignment lens are exposed, said alignment lens being movably accommodated in said first lens barrel, and said alignment lens being moved, in the direction perpendicular to the optical axis, by pins inserted through said plurality of holes, respectively.

2. The objective optical system according to claim 1, wherein said alignment lens is more sensitive, to an alignment error than all of the plurality of lens elements included in said first optical system.

3. The objective optical system according to claim 1, wherein said alignment lens is more sensitive to an alignment error than all of the lens elements included in said objective optical system.

4. The objective optical system according to claim 3, wherein said alignment lens is a cemented lens.

5. The objective optical system according to claim 1, wherein said first lens barrel is attached to said second lens barrel by a screw connection.

6. The objective optical system according to claim 1, wherein a threaded portion is provided on an inner surface of the first lens barrel which engages with a screw provided on an outer surface of the second lens barrel.

7. The objective optical system according to claim 1, wherein the unthreaded holes is configured to receive unthreaded pins that bear against the circumferential surface of the alignment lens.

8. The objective optical system according to claim 1, wherein the optical system is configured such that the pins are removed from the holes after the alignment lens is aligned by the pins bearing against the circumferential surface of the alignment lens.

9. The objective optical system according to claim 1, wherein a plurality of unthreaded holes are circumferentially spaced about the circumferential surface of the alignment lens.

10. The objective optical system according to claim 1, wherein a clearance between the first lens barrel and the alignment lens is greater than a clearance between the first lens barrel and the plurality of lens elements of the first lens unit.

11. The objective optical system according to claim 1, wherein the unthreaded holes are sized so as to expose the parts of the circumferential surface of the alignment lens without exposing a portion of the circumferential surface of the plurality of lens elements of the first lens unit.

12. The objective optical system according to claim 1, wherein each of said pins is configured to bear against the circumferential surface of the alignment lens while being biased away from the circumferential surface of the alignment lens.

13. A method of assembling an objective optical system that is configured to be implemented in a tip of an endoscope, the method comprising:
   forming a first optical system by assembling a first plurality of lenses in a first lens barrel such that the first plurality of lenses are aligned in a direction of a first common optical axis, the first lens barrel being formed with a plurality of unthreaded holes on a circumferential surface thereof, the plurality of holes allowing access to a predetermined one of the first plurality of lenses in the first lens barrel and through which parts of a circumferential surface of the predetermined one of the first plurality of lenses are exposed;
   providing the first lens unit with a fixing unit to fix the first optical system to the first lens barrel and providing the fixing unit with a threaded surface that is engageable with a threaded surface of the first lens barrel to fix the first optical system to the first lens barrel;
   forming a second optical system by assembling a second plurality of lenses in a second lens barrel which is to be coupled to the first lens barrel such that the second plurality of lenses are aligned in a direction of a second common optical axis;
   inserting rods through the plurality of holes to move the predetermined one of the first plurality of lenses in the first lens barrel to adjust an alignment thereof in a direction perpendicular to an optical axis thereof, movement of the predetermined one of the first plurality of lenses in the first lens barrel alone adjusting the alignment of the entire first plurality of lenses in the first lens barrel;
   fixing the predetermined one of the first plurality of lenses to the first lens barrel; and coupling the first lens barrel and the second lens barrel such that the first optical system and the second optical system have a common optical axis, and the first plurality of lenses and the second plurality of lenses are aligned along the common optical axis, coupling of the first lens barrel and the second lens barrel comprising interposing the fixing unit between the first lens barrel and the second lens barrel to define a clearance therebetween.

14. The method according to claim 13, wherein inserting rods through the plurality of holes comprises inserting unthreaded rods through the holes to bear against the circumferential surface of the predetermined one of the first plurality of lenses.

15. The method according to claim 13, wherein inserting rods through the plurality of holes comprises removing the rods from the holes after the predetermined one of the first plurality of lenses is aligned by the rods bearing against the circumferential surface of the predetermined one of the first plurality of lenses.

16. The method according to claim 13, further comprising locating the plurality of unthreaded holes circumferentially spaced about a circumferential surface of the predetermined one of the first plurality of lenses.

17. The method of assembling an objective optical system according to claim 13, the forming of the first optical system further comprising providing a clearance between the first lens barrel and the predetermined one of the first plurality of lenses to be greater than a clearance between the first lens barrel and the other lenses of the first plurality of lenses of the first optical system.

18. The method of assembling an objective optical system according to claim 13, the forming of the plurality of unthreaded holes comprises forming a size of the plurality of holes so as to allow access to a circumferential surface of the predetermined one of the first plurality of lenses in the first lens barrel without permitting access to the circumferential surface of the other ones of the first plurality of lenses in the first lens barrel.

19. The method of assembling an objective optical system according to claim 13, wherein inserting the rods comprises arranging the rods to bear against the circumferential surface of the predetermined one of the first plurality of lenses while being biased away from the circumferential surface of the predetermined one of the first plurality of lenses.

* * * * *